United States Patent
Kramer et al.

(10) Patent No.: US 6,317,508 B1
(45) Date of Patent: *Nov. 13, 2001

(54) SCANNING CAPACITIVE SEMICONDUCTOR FINGERPRINT DETECTOR

(75) Inventors: Alan Kramer, Berkeley, CA (US); James Brady, Plano, TX (US)

(73) Assignee: STMicroelectronics, Inc., Carrollton, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/006,670

(22) Filed: Jan. 13, 1998

(51) Int. Cl.[7] .................................................. G06R 9/00
(52) U.S. Cl. ....................... 382/124; 382/126; 382/312; 235/439; 235/445; 235/447; 235/451
(58) Field of Search .................................. 382/124, 126, 382/312; 235/439, 445, 446, 447, 451

(56) References Cited

U.S. PATENT DOCUMENTS

| | | | |
|---|---|---|---|
| 4,016,490 | * 4/1977 | Weckenmann et al. | 324/61 |
| 4,353,056 | * 10/1982 | Tsikos | 340/146.3 |
| 4,394,773 | * 7/1983 | Ruell | 340/146.3 |
| 4,429,413 | * 1/1984 | Edwards | 382/2 |
| 4,550,221 | * 10/1985 | Mabusth | 345/173 |
| 4,577,345 | * 3/1986 | Abramov | 382/4 |
| 4,784,484 | 11/1988 | Jensen | 356/71 |
| 4,933,976 | 6/1990 | Fishbine | 382/4 |
| 5,325,442 | 6/1994 | Knapp | 382/4 |
| 5,400,662 | 3/1995 | Tamori | 73/862.046 |
| 5,416,573 | * 5/1995 | Sartor, Jr. | 356/71 |
| 5,429,006 | 7/1995 | Tamori | 73/862.046 |
| 5,467,403 | 11/1995 | Fishbine et al. | 382/116 |
| 5,548,394 | 8/1996 | Giles et al. | 356/71 |
| 5,657,012 | * 8/1997 | Tait | 324/686 |
| 5,801,313 | * 9/1998 | Horibata et al. | 73/718 |
| 5,828,773 | * 10/1998 | Setlak et al. | 382/126 |
| 5,864,296 | * 1/1999 | Upton | 340/825.3 |
| 6,011,859 | * 1/2000 | Kalnitsky et al. | 382/124 |
| 6,114,862 | * 9/2000 | Tartagni et al. | 324/662 |

FOREIGN PATENT DOCUMENTS

| | | | |
|---|---|---|---|
| 0 790 479 A1 | 8/1997 | (EP) | G01B/7/00 |
| 0 813 164 A1 | 6/1997 | (EP) | G06K/9/00 |

OTHER PUBLICATIONS

Thomson–CSF Semiconducteurs Specifiques, Introducing the FingerChip™: The silicon chip fingerprint sensor from Thomson–CSF Semiconducteurs Specifiques, ©1997 TCS, 2 pp.

©1997 SGS–Thomson Microelectronics, TouchChip™ Silicon Fingerprint Sensor, Nov. 1997, 6 pp.

Press Release Communique De Presse Communicato Stampa Presseinformation, SGS–Thomson's Silicon Fingerprint Sensor Offers Cost–effective Biometric Solution for Security, Comdex, Las Vegas—Nov. 17, 1997, 2 pp.

A390 dpi Live Fingerprint Image Based on Feedback Capacitive Sensing Scheme, IEEE international solid State Circuits Conference, pp. 200–201, 456, Feb. 1977.*

"A Fingerprint Sensor Based Upon the Feedback Capacitive Sensing Scheme," Tartagni et al., IEEE Journal of Solid–States Circuit, vol. 33, No. 1, pp. 133–142, Jan. 1998 Marco Tartagni et al.

* cited by examiner

Primary Examiner—Matthew C. Bella
Assistant Examiner—Sheela Chawan
(74) Attorney, Agent, or Firm—Lisa K. Jorgenson; Peter J. Thoma

(57) ABSTRACT

A scanning fingerprint detection system that includes an array of capacitive sensing elements. The array has a first dimension greater than the width of a fingerprint and a second dimension less than the length of a fingerprint. Each of the capacitive sensing elements has a size less than the width of a fingerprint ridge. Circuitry is provided for scanning the array to capture an image of a portion of fingerprint and for assembling the captured images into a fingerprint image as a fingerprint is moved over the array.

12 Claims, 2 Drawing Sheets

SCANNING CAPACITIVE SEMICONDUCTOR FINGERPRINT DETECTOR

FIELD OF THE INVENTION

The present invention relates generally to methods of and systems for capturing fingerprint images, and more particularly to a semiconductor capacitive fingerprint scanning device.

DESCRIPTION OF THE PRIOR ART

Fingerprint recognition has been suggested for use in many security applications such as controlling access to buildings, computers, or the like. Fingerprint recognition systems enable a user to access the controlled facility without a device such as a key or smart card or without having to memorize a password or other personal identification number.

The sensing device is an important part of a fingerprint recognition system and the quality of the representation of the fingerprint that the device produces will affect recognition capability and the amount of processing required for verification of the fingerprint. Various technologies have been proposed for use in fingerprint sensing devices. One commonly proposed technology involves optical detection. Examples of optical fingerprint detection devices are disclosed in Jensen, U.S. Pat. No. 4,784,484; Fishbine, et al., U.S. Pat. No. 5,467,403; and Giles, et al., U.S. Pat. No. 5,548,394.

Optical detectors include a glass surface upon which a subject places his finger to be recognized. Optical detectors may present recognition problems when the glass surface or the subject's finger is wet. The optics of the detectors are constructed based upon the indices of refraction of air and glass. When water or perspiration is between the glass and the surface of the finger, the operation of the detector is affected.

In addition to optical sensors, various electrical sensor systems have been proposed, as for example in Knapp, U.S. Pat. No. 5,325,442; Tamori, U.S. Pat. No. 5,400,662; and Tamori, U.S. Pat. No. 5,429,006. The electrical detection devices typically comprise an array of sense elements. The individual sense elements respond with an output that depends upon whether a fingerprint ridge or valley is located over the sense element.

The electrical detection devices offer advantages over the optical detection devices. However, an electrical detector that is large enough to detect a fingerprint is a large and expensive semiconductor device. For example, the Touch-Chip (TM) Silicon Fingerprint Sensor (STFP2015-50) available from SGS-Thomson Microelectronics has an active sensor surface measuring 19.2 mm by 12.8 mm that includes a 384 by 256 sensor array. Accordingly, electrical detection device tend to be more expensive than optical detectors.

It is an object of the present invention to provide a fingerprint detecting device that overcomes the shortcomings of the prior art.

SUMMARY OF THE INVENTION

The present invention provides a scanning fingerprint detection system that includes an array of capacitive sensing elements. The array has a first dimension about the width of a fingerprint and a second dimension substantially less than the length of a fingerprint. Each of the capacitive sensing elements has a size less than the width of a fingerprint ridge. Circuitry is provided for scanning the array to capture an image of a portion of fingerprint and for assembling the captured images into a fingerprint image as a fingerprint is moved over the array.

DESCRIPTION OF THE PREFERRED EMBODIMENT

Figure 1:
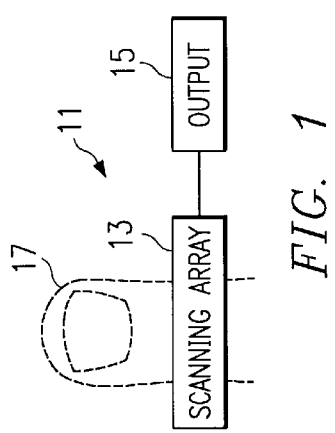
FIG. 1 is a block diagram of a system according to the present invention.

Referring now to the drawings, and first to FIG. 1, a fingerprint scanner according to the present invention is designated generally by the numeral 11. Fingerprint scanner 11 includes a scanning array 13, which captures an image of a fingerprint, and a suitable output 15. Scanning array 13 is preferably fabricated on a single semiconductor chip.

Scanning array 13 is rectangular in shape and has a width about the width of the surface of a finger 17 that contacts scanning array 13. In the preferred embodiment, scanning array 13 is about one-half inch or 12.8 mm wide. The length of scanning array 13 is substantially less than the length of the end of finger 17, and in the preferred embodiment, the length of scanning array 13 is about one-tenth inch or 2.5 mm. As will be described in detail hereinafter, fingerprint scanner 11 captures a fingerprint image as finger 17 is swept over scanning array 13.

Figure 2:
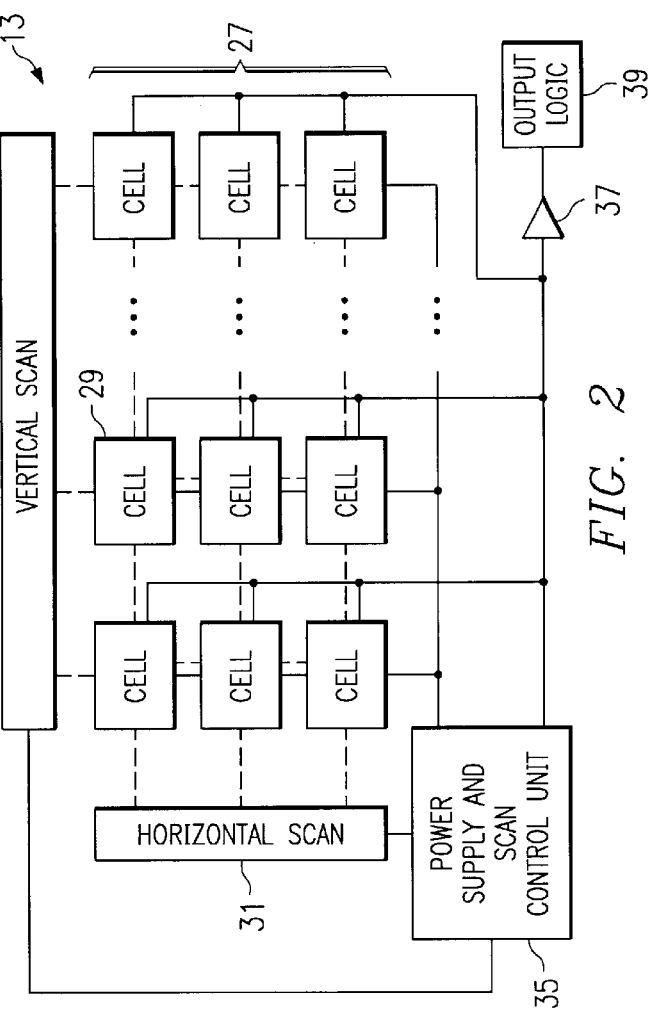
FIG. 2 is a block diagram of a sensor array according to the present invention.

Referring now to FIG. 2, there is shown a block diagram of scanning array 13. Scanning array 13 is preferably integrated into a single chip, and it includes a rectangular array 27 of cells 29 of the type illustrated in FIG. 3 hereof. Each cell 29 is smaller than the width of a fingerprint ridge.

In the preferred embodiment, cells 29 are on a pitch of 50 $\mu$m, which corresponds to a resolution of about 508 dpi. The exact number of rows needed depends upon the capabilities of the image regeneration software as well as the maximum finger speed and the frame rate at which array 27 is scanned. The number of rows must be sufficient so that, when the finger is moving at its maximum speed, a pair of consecutive frames has enough rows in common for them to be aligned by the regeneration algorithm. The more image rows in common from one frame to the next, the more exactly the regeneration algorithm came combine two frames into a single larger frame. In the preferred embodiment, array 27 comprises about twenty to fifty rows of cells in the shorter dimension and about 250 columns of cells in the longer dimension.

Scanning array 13 includes a horizontal scanning stage 31 and a vertical scanning stage 33. Scanning stages 31 and 33 enable one cell 29 at a time according to a predetermined scanning pattern. The scanning rate depends upon the maximum finger speed and the amount of blurring that can be tolerated. In the preferred embodiment, each cell 29 is scanned at a rate once each one to ten millisecond to produce a frame rate of 100 to 1,000 frames per second.

Scanning array 13 includes a power supply and scan control unit 35. Power supply and scan control unit 35 supplies a reference voltage to each cell 29 of array 27. Power supply and scan control 35 also operate scanning stages 31 and 33 to produce the desired scanning of cells 29.

An A/D converter 37 is connected to receive the output of each cell 29 of array 27. The output of A/D converter 37 is connected to output logic 39. Output logic 39 processes the output of A/D converter 37 to capture successive images of a portion of the fingerprint of the user. Output logic 39 compares successive images to detect movement of the fingerprint. If output logic 39 detects movement, output logic computes the displacement of the fingerprint ridges over the scanning period, which in the preferred embodiment is one to ten milliseconds, and assembles the captured images into a complete fingerprint image.

Figure 3:
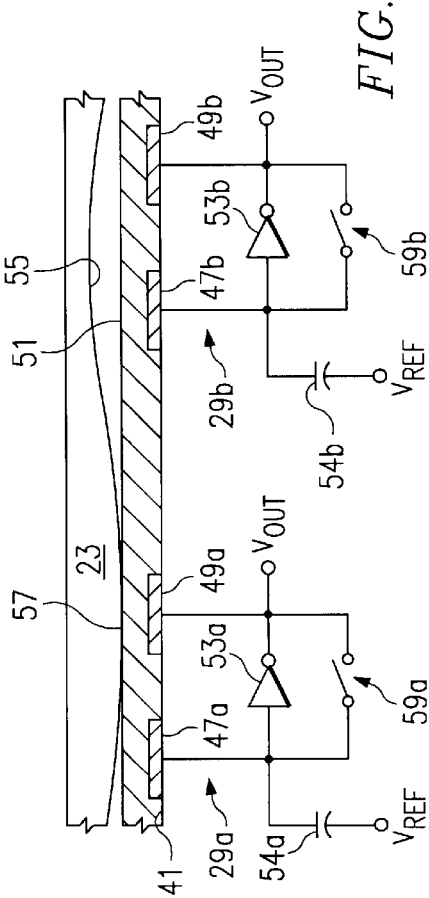
FIG. 3 illustrates the physical structure and electrical operation of individual sensor cells according to the present invention.

Referring now to FIG. 3, there is illustrated the structure and operation of a cell 29 according to the present invention. The cell of the preferred embodiment of the present invention is of type disclosed in Tartagni, U.S. patent application Ser. No. 08/799,548, filed Feb. 13, 1997, entitled Capacitive Distance Sensor, the disclosure of which is incorporated herein by reference. Each cell 29 includes a first conductor plate 47 and a second conductor plate 49 supported on a semiconductor substrate, which is preferably a conventional silicon substrate that may have a conventional shallow epitaxial layer defining an upper surface region thereof. The top surface of the substrate includes an insulating layer 41. Insulating layer 41 is preferably an oxide layer, which may be a conventional thermally grown silicon dioxide layer. Conductor plates 47 and 49 are covered by a protective coating 51 of a hard material, which protects cell 29 from moisture, contamination, abrasion, and electrostatic discharge.

Each cell 29 includes a high gain inverting amplifier 53. The input of inverter 53 is connected to a reference voltage source $V_{REF}$ through an input capacitor 54. The output of inverter 53 is connected to an output $V_{OUT}$. The input of inverter 53 is also connected to conductor plate 47 and the output of inverter 53 is also connected to conductor plate 49, thereby creating a charge integrator whose feedback capacitance is the effective capacitance between conductor plates 47 and 49.

When a finger 23 is placed on the surface of protective layer 51, the surface of the skin over each sensor acts as a third capacitor plate separated from adjacent conductor plates 47 and 49 by a dielectric layer that includes protective coating 51 and a variable thickness of air. Because fingerprint valleys or pores will be farther from conductor plates 47 and 49 than finger ridges 57, sensors 29 beneath valleys or pores will have more distance between their conductor plates 47 and 49 and the skin surface than sensors under ridges. The thickness of this dielectric layer will modulate the capacitance coupling between plates 47 and 49 of each cell 29. Accordingly, sensors 29 under valleys or pores will exhibit a different effective capacitance than sensors 29 under ridges. As shown in FIG. 3, the effective capacitance of sensor 29a is different from the effective capacitance of sensor 29b.

Sensors 29 work in two phases. During the first phase, the charge integrator is reset with a switch 59 by shorting the input and output of inverter 53. This causes inverter 53 to settle at its logical threshold. During the second phase a fixed charge is input to the charge integrator, causing an output voltage swing inversely proportional to the feedback capacitance, which is the effective capacitance between conductor plates 47 and 49. For a fixed amount of input charge, the output of inverter 53 will range between two extremes depending on the effective feedback capacitance value. The first extreme is a saturated voltage level if the effective feedback capacitance is very small. The second extreme is a voltage close to the logical threshold, which is the reset value, when the effective feedback capacitance is large. Since the distance between the skin and the sensor changes the effective feedback capacitance of the charge integrator, the output of sensor 29a under ridge 57 will be different from the output of sensor 29b under valley 55.

Figure 4:
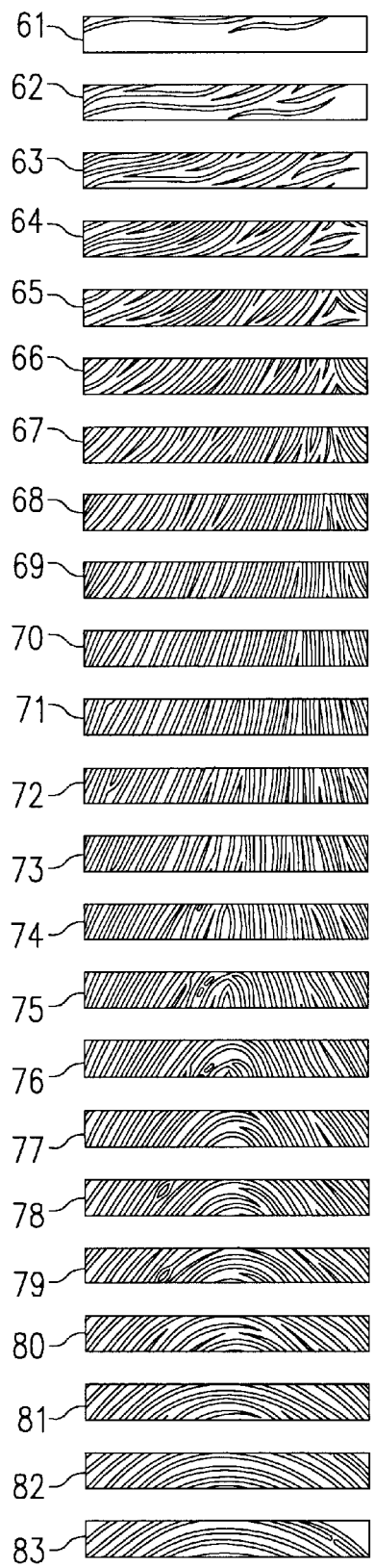
FIG. 4 illustrates a sequence of partial fingerprint images captured according to the present invention.
Figure 5:
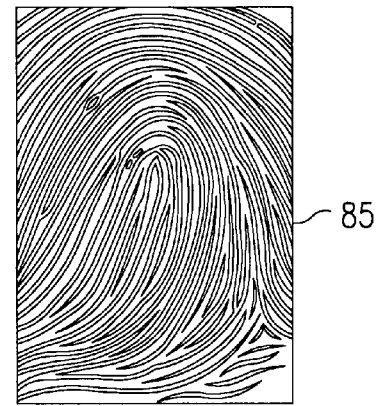
FIG. 5 illustrates a fingerprint image assembled according to the present invention from the partial images of FIG. 4.

The operation of the present invention to capture a fingerprint image is illustrated with respect to FIGS. 4 and 5. FIG. 4 illustrates a sequence of partial fingerprint images 61–83 captured according to the present invention. FIG. 5 illustrates a fingerprint image 85 assembled according to the present invention from partial images 61–83. In FIG. 4, partial image 61 is captured first and partial image 62 is captured an instant later. It will be noted that partial images 61 and 62 share a number of common fingerprint features. Similarly, partial images 63 through 83 are captured at sequentially later instants of time and they each share fingerprint features with their sequentially adjacent partial images. Output logic 39 of FIG. 2 compares successive partial images 61–83 to detect movement of the fingerprint. If output logic 39 detects movement, output logic computes the displacement of the fingerprint ridges over the scanning period, which in the preferred embodiment is one to ten milliseconds, and assembles the captured images into a complete fingerprint image 85.

From the foregoing, it may be seen that the present invention is well adapted to overcome the shortcomings of the prior art. The capacitive sensors of the present invention enable the device to be scanned at a high frame rate. The high frame rate enables a finger to be moved quickly over the device. Additionally, the high frame rate reduces the number of rows needed to capture the successive images. The device of the present invention is thus small in size, and it may be fabricated on a single integrated circuit chip. The present invention provides the advantages of electrical fingerprint detection at a cost lower than optical systems.

Although the present invention has been illustrated and described with respect to a presently preferred embodiment, it is to be understood that various changes, substitutions and alterations can be made therein without departing from the spirit and scope of the invention as defined by the appended claims.

What is claimed is:

1. A scanning fingerprint detection system, which comprises:
   a sensing array having a first dimension and a second dimension;
      said first dimension extending at least the width of a fingerprint;
      said second dimension extending less than the length of a fingerprint;
      said sensing array formed of a plurality of elements;
         wherein each of said elements is a capacitive sensing cell and having a size less than the width of a ridge of a fingerprint;
   means for scanning said sensing array to capture successive images of successive portions of the fingerprint formed as the fingerprint is moved across the sensing array in a direction parallel to the second dimension; and
   means for assembling the captured successive images into a complete fingerprint image.

2. The scanning fingerprint detection system as claimed in claim 1, wherein a capacitive sensing cell comprises:

a first conductor positioned on a substrate and defining a first plate of said capacitive sensing cell;

a second conductor positioned on said substrate and defining a second plate of said capacitive sensing cell, said first and second conductors being spaced apart from each other;

a reference voltage source providing an input voltage; and, an amplifier having an input and output, said input being coupled to said reference voltage and said first conductor, and said output being coupled to said second conductor.

3. The scanning fingerprint detection system as claimed in claim 2, wherein said amplifier includes an inverting amplifier.

4. The scanning fingerprint detection system as claimed in claim 2, including a protective coating deposited over said first and second conductor.

5. The scanning fingerprint detection system as claimed in claim 2, including an input capacitor coupled between said reference voltage source and said input of said amplifier.

6. The scanning fingerprint detection system as claimed in claim 2, including a switch connected between said input and said output of said amplifier.

7. The scanning fingerprint detection system as claimed in claim 1, wherein a capacitive sensing cell comprises:

a first conductor supported by a semiconductor substrate and defining a first plate of said capacitive sensing cell;

a second conductor supported by said semiconductor substrate and defining a second plate of said capacitive sensing cell, said first and second conductors being spaced apart from each other;

a reference voltage source providing an input voltage;

an inverting amplifier having an input and output, said input being coupled to said reference voltage and said first conductor plate, and said output being coupled to said second conductor plate;

an input capacitor connected between said reference voltage source and said input of said inverting amplifier; and a switch connected between said input and said output of said inverting amplifier.

8. The scanning fingerprint detection system as claimed in claim 7, wherein said first dimension is about one-half inch and said second dimension is about one-tenth inch.

9. A scanning fingerprint detection system, which comprises:

a sensing array having a first dimension and a second dimension;
said first dimension extending at least the width of a fingerprint, wherein said first dimension is about one-half inch;
said second dimension extending less than the length of a fingerprint, wherein said second dimension is about one-tenth inch;
said sensing array formed of a plurality of elements;
wherein each of said elements is a capacitive sensing cell and having a size less than the width of a ridge of a fingerprint, wherein each capacitive sensing cell comprises:

a first conductor positioned on a substrate and defining a first plate of said capacitive sensing element;

a second conductor positioned on said substrate and defining a second plate of said capacitive sensing element, said first and second conductors being spaced apart from each other;

a reference voltage source providing an input voltage; and, an amplifier having an input and output, said input being coupled to said reference voltage and said first conductor, and said output being coupled to said second conductor.

10. A fingerprint detection system comprising:

an insulating layer supported by a semiconductor substrate, said insulating layer having an upper surface;

a capacitive sensor disposed on said upper surface, said sensor extending in a plane parallel to and above said upper surface of said insulating layer, said sensor generating electrical signals based on a fingerprint sensed as the fingerprint is moved along and parallel to said plane;

image generating circuitry electrically connected to said capacitive sensor for receiving the electrical signals and assembling an image corresponding to a complete fingerprint that is successively sensed by said capacitive sensor during movement of the fingerprint thereover; and wherein said sensor has a first dimension parallel to said plane and a second dimension parallel to said plane, said first dimension being substantially longer than said second dimension, and wherein the fingerprint is moved in a direction generally parallel to said second dimension.

11. The fingerprint detection system as claimed in claim 10, wherein said first dimension is about ½ inch and said second dimension is about ⅒ inch.

12. The fingerprint detection system as claimed in claim 10, wherein said capacitive sensor comprises an array of sensing elements.

* * * * *